(12) United States Patent
Lee et al.

(10) Patent No.: US 10,078,172 B2
(45) Date of Patent: Sep. 18, 2018

(54) PRISM PLATE, DISPLAY DEVICE HAVING THE SAME, AND METHOD OF MANUFACTURING PRISM PLATE

(71) Applicant: Samsung Display Co., LTD., Yongin-si, Gyeonggi-Do (KR)

(72) Inventors: Kang-woo Lee, Seoul (KR); Youra Kim, Seoul (KR); Myeong-ju Shin, Seoul (KR); Seunghwan Chung, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 65 days.

(21) Appl. No.: 15/019,348

(22) Filed: Feb. 9, 2016

(65) Prior Publication Data

US 2016/0291239 A1    Oct. 6, 2016

(30) Foreign Application Priority Data

Mar. 31, 2015  (KR) .................. 10-2015-0045665

(51) Int. Cl.
*F21V 9/14* (2006.01)
*F21V 8/00* (2006.01)
*G02B 5/04* (2006.01)
*G02B 3/00* (2006.01)
*G02B 5/02* (2006.01)
*G02B 5/30* (2006.01)

(52) U.S. Cl.
CPC ......... *G02B 6/0053* (2013.01); *G02B 3/0056* (2013.01); *G02B 5/021* (2013.01); *G02B 5/045* (2013.01); *G02B 5/3025* (2013.01); *G02B 6/0051* (2013.01); *G02B 6/0056* (2013.01)

(58) Field of Classification Search
CPC ............ F21V 9/14; F21V 11/02; F21S 48/115
USPC .......................................... 362/19, 506–512
See application file for complete search history.

(56) References Cited

U.S. PATENT DOCUMENTS

| 5,126,882 A | 6/1992 | Oe et al. |
|---|---|---|
| 6,874,902 B2 | 4/2005 | Yamashita et al. |
| 2009/0195728 A1* | 8/2009 | Obata .................. G02B 5/3025 349/62 |
| 2012/0086890 A1* | 4/2012 | Shimokawa ...... G02F 1/133308 349/65 |
| 2013/0114300 A1* | 5/2013 | Lee ..................... G02B 6/0038 362/620 |

FOREIGN PATENT DOCUMENTS

| KR | 1020110072124 A | 6/2011 |
|---|---|---|
| KR | 1020110095553 A | 8/2011 |
| KR | 1020130015948 | 2/2013 |
| KR | 1020140011702 | 1/2014 |
| KR | 1020140047381 | 4/2014 |

* cited by examiner

*Primary Examiner* — Daniel St Cyr
(74) *Attorney, Agent, or Firm* — Cantor Colburn LLP

(57) ABSTRACT

A display device includes a display panel and a backlight unit which provides light to the display panel. The backlight unit includes a light source which emits the light, a light guide plate which guides the light emitted from the light source toward the display panel, and a prism plate. The prism plate includes a base film disposed on the light guide plate and a plurality of prisms disposed on the base film. Each of the prisms has an isosceles trapezoidal section, two base angles of which are obtuse angles, when viewed from a cross-sectional view in a width direction.

15 Claims, 8 Drawing Sheets

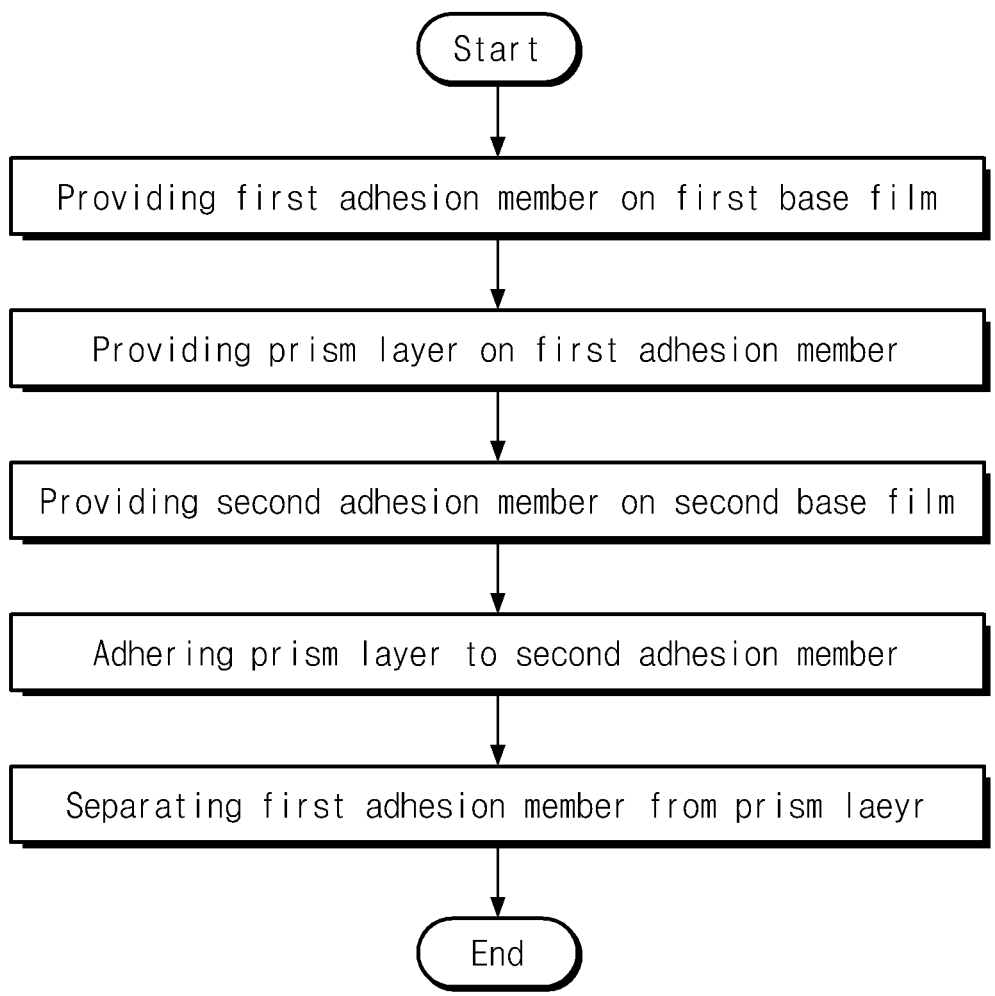

PRISM PLATE, DISPLAY DEVICE HAVING THE SAME, AND METHOD OF MANUFACTURING PRISM PLATE

This application claims priority to Korean Patent Application No. 10-2015-0045665, filed on Mar. 31, 2015, and all the benefits accruing therefrom under 35 U.S.C. § 119, the content of which in its entirety is herein incorporated by reference.

BACKGROUND

1. Field

The disclosure herein relates to a prism plate, a display device including the prism plate, and a method of manufacturing the prism plate.

2. Description of the Related Art

In non-light emitting display devices such as liquid crystal display devices, since display panels displaying images do not emit light by themselves, the non-light emitting display device includes a backlight unit for supplying light to the display panel.

The backlight unit may include a light source that emits the light, a light guide panel that guides light emitted from the light source toward the display panel, and an optical member that controls a path of the light emitted from the light guide panel.

Recently, resolution of the display device is gradually increasing, for example, from full high definition ("FHD") resolution of 1920×1080 pixels to 8K ultra high definition ("UHD") resolution of 7680×4320 pixels or 4K UHD resolution of 3840×2160 pixels. Thus, a pixel may decrease in size to reduce brightness of a display screen.

SUMMARY

In a curved display device, a polarization member may be used to improve viewing angles. However, the polarization member may reduce the brightness of the display screen. Therefore, there is a growing demand for a backlight unit having high light concentration efficiency.

The disclosure provides a display device including a backlight unit that provides highly concentrated light to a display panel.

An embodiment of the inventive concept provides a display device including a display panel and a backlight unit that provides light to the display panel.

In an embodiment, the backlight unit may include a light source which emits the light, a light guide plate, and a prism plate. In such an embodiment, the light guide plate may guide the light emitted from the light source toward the display panel.

In an embodiment, the prism plate may include a base film and a plurality of prisms. In such an embodiment, the base film is disposed on the light guide plate, and the plurality of prisms is disposed on the film. In such an embodiment, each of the prisms may have an isosceles trapezoidal section, two base angles of which are obtuse angles, when viewed from a cross-sectional view in a width direction. In such an embodiment, the prisms may concentrate light emitted from the light guide plate In an embodiment, the trapezoidal shape may have an isosceles trapezoidal shape.

In an embodiment, a value ($\theta$) of each of the two base angles may satisfy the following equation:

$$\theta = \frac{\pi}{2} + \frac{1}{2}\left[\sin^{-1}\left(\frac{n_{pet}}{n_R}\sin^{-1}\left(\frac{\sin\alpha}{n_{pet}}\right)\right) + \sin^{-1}\left(\frac{\sin\beta}{n_R}\right)\right]$$

where $n_{pct}$ denotes a refractive index of the base film, $n_R$ denotes a refractive index of the prism plate, $\alpha$ denotes an incident angle of light incident into the base film, and $\beta$ denotes an emission angle of light emitted from each of the plurality of prisms.

In an embodiment, the incident angle $\alpha$ of light incident into the base film may be about $7\pi/18$ radian, and the emission angle $\beta$ of light emitted from each of the plurality of prisms may be about zero radian.

In an embodiment, each of the plurality of prisms may have a refractive index in a range of about 1.45 to about 1.65, and the base film has a refractive index in a range of about 1.51 to about 1.71.

In an embodiment, the refractive index of each of the plurality of prisms may be less than the refractive index of the base film.

In an embodiment, a lower base of the trapezoidal shape may have a length of about 0.3 times to about 0.7 times of a length of an upper side of the trapezoidal shape.

In an embodiment, the upper side may have a length of about 45 micrometers ($\mu$m) to about 55 $\mu$m.

In an embodiment, the prism plate may further include an auxiliary prism plate disposed on the plurality of prisms.

In an embodiment, the auxiliary prism plate and the plurality of prisms may be integrated with each other In an embodiment, the display device may further include a diffusion plate disposed between the prism plate and the display pane. In such an embodiment, the diffusion plate may include a polarization member and a lens member. In such an embodiment, the lens member may be disposed on the polarization member. In such an embodiment, the lens member may include a plurality of diffusion patterns each of which includes a convex lens surface.

In an embodiment, a lower base of each of the plurality of diffusion patterns may have a length in a range of about 9 $\mu$m to about 11 $\mu$m.

In an embodiment, the lens member may have a refractive index in a range of about 1.43 to about 1.63.

In an embodiment, a curved display surface may be defined in the display panel along a direction axis.

In an embodiment, the light guide plate may be curved along the direction axis.

In an embodiments of the inventive concept, a method of manufacturing a prism plate includes: providing a first adhesion member having a first adhesion force on a first base film; providing a prism layer including a plurality of prisms on the first adhesion member, where each of the plurality of prisms has an isosceles trapezoidal section, two base angles of which are obtuse angles, when viewed from a cross-sectional view in a thickness direction; providing a second adhesion member having a second adhesion force, which is greater than the first adhesion force, on a second base film; adhering the second adhesion member to the prism layer; and separating the first adhesion member from the prism layer.

BRIEF DESCRIPTION OF THE FIGURES

The above and other features of embodiments of the inventive concept will become readily apparent by reference to the following detailed description when considered in conjunction with the accompanying drawings, in which:

FIG. 9 is a flowchart showing an embodiment of the method of manufacturing the prism plate according to the inventive concept.

DETAILED DESCRIPTION

Figure 1:
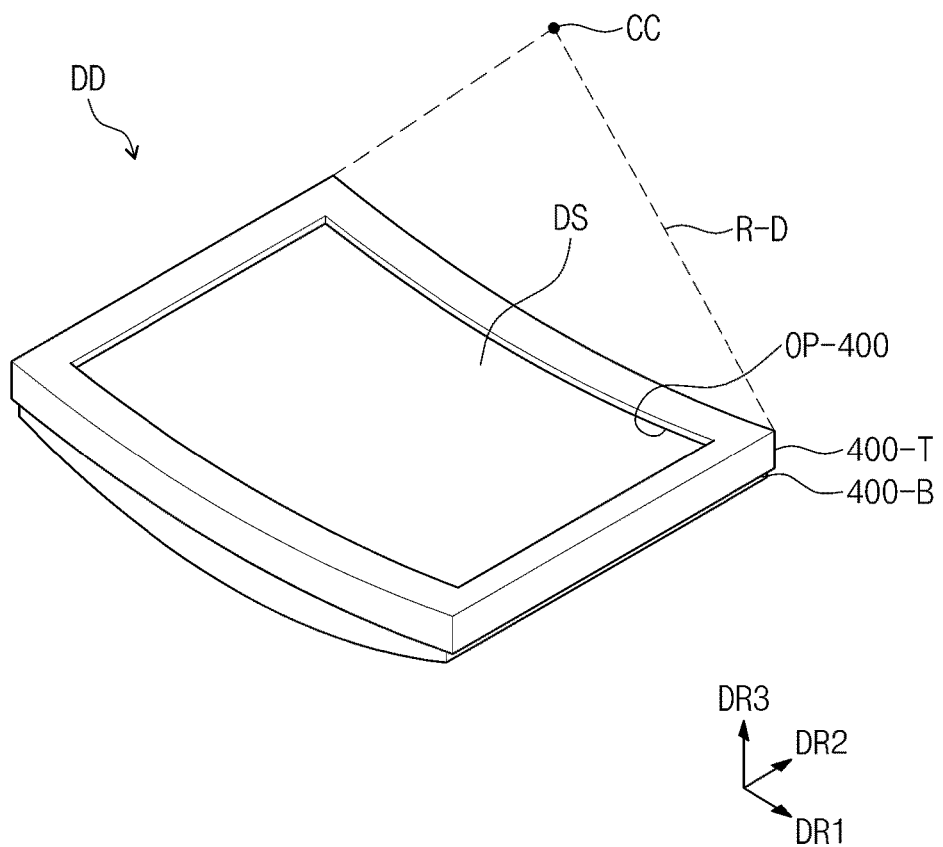
FIG. 1 is a perspective view of an embodiment of a display device according to the inventive concept.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

Figure 2:
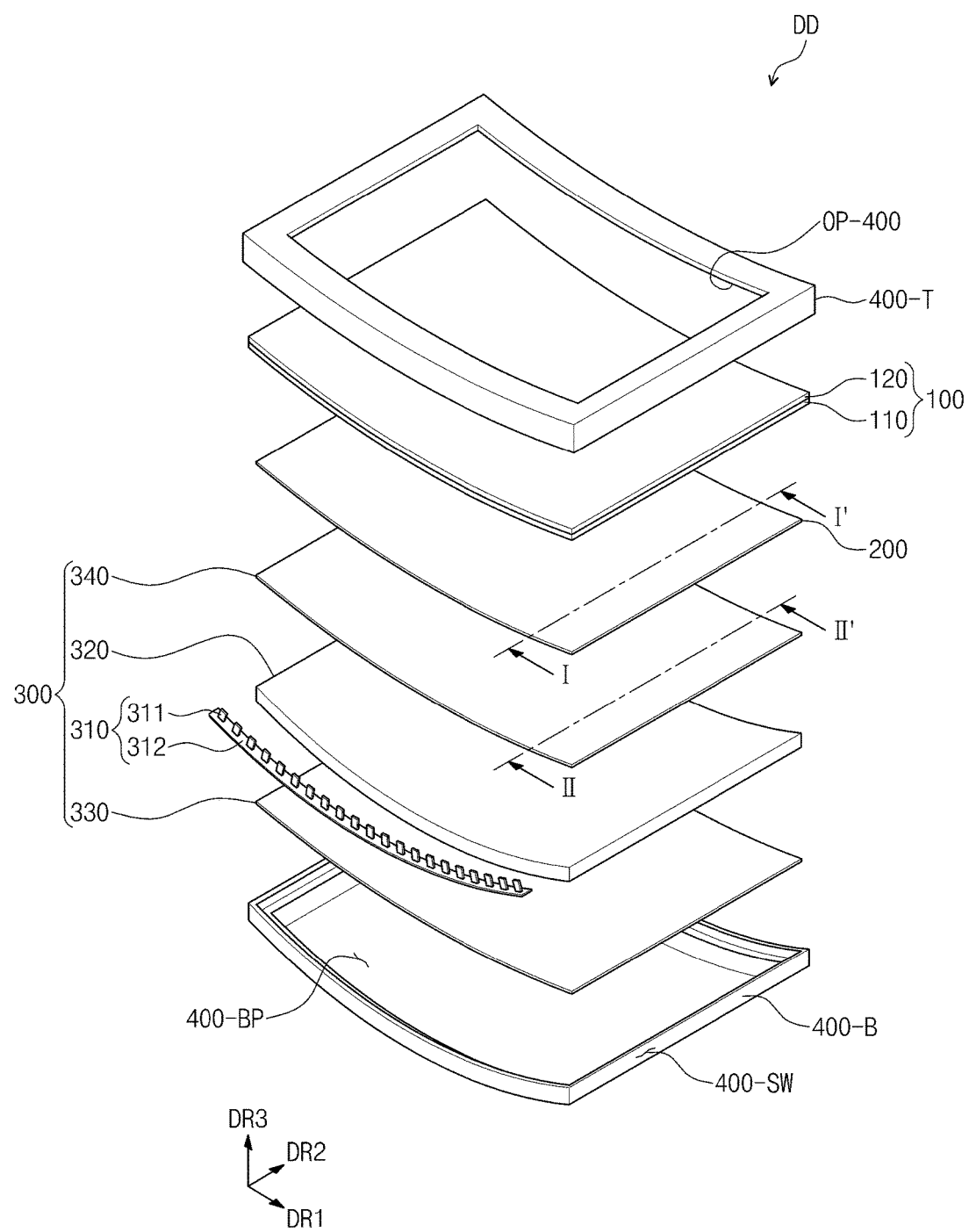
FIG. 2 is an exploded perspective view of an embodiment of the display device according to the inventive concept.

FIG. 1 is a perspective view of an embodiment of a display device according to the inventive concept. FIG. 2 is an exploded perspective view of an embodiment of the display device according to the inventive concept. Hereinafter, an embodiment of a display device DD according to the inventive concept will be described with reference to FIGS. 1 and 2.

As illustrated in FIGS. 1 and 2, an embodiment of the display device DD includes a display panel 100, a diffusion plate 200, a backlight unit 300, and cover members 400-B and 400-T. Although not shown, the display device DD may further include a mold member for supporting the display panel 100 or the diffusion plate 200.

In an embodiment, as illustrated in FIG. 1, the display device DD may have a predetermined curvature and a predetermined radius of curvature R-D with respect to a reference point CC. In such an embodiment, the display device DD includes a curved display surface DS. In such an embodiment, the display surface DS is defined by a surface of the display panel 100. The radius of curvature R-D is measured from the display surface DS. In one embodiment, for example, a 65-inch display device DD may have a radius of curvature of about 4000 millimeters (mm). The display device DD may have substantially the same curvature and radius of curvature R-D as those of the display panel 100, but not being limited thereto. In an alternative embodiment, the display device DD may have a flat surface that is not curved.

The flat display surface DS that is not yet bent is defined by a first direction axis DR1 and a second direction axis DR2. Also, a thickness direction of the display panel 100 is defined by a third direction axis DR3.

Referring to FIGS. 1 and 2, the display panel 100 displays an image. In an embodiment, the display panel 100 may include a non-light emitting type display panel that receives light from a separate light source, that is, a reflective/transmissive display panel or a transmissive display panel, but not being limited thereto. Hereinafter, for convenience of description, an embodiment where the display panel 100 is a liquid crystal display panel will be described in detail, but not being limited thereto.

In such an embodiment, the display panel 100 may include a first substrate 110, a second substrate 120 disposed opposite to, e.g., facing, the first substrate 110, and a liquid crystal layer (not shown) disposed between the first substrate 110 and the second substrate 120. The liquid crystal layer may include a plurality of liquid crystal molecules, arrangement of which changes according to electric fields generated between the first substrate 110 and the second substrate 120. In such an embodiment, a pair of polarization plate (not shown) may be disposed on upper and lower portions of the display panel 100.

The display panel 100 may be curved in a concave shape along the first direction axis DR1. The display panel 100 may be provided by using the flat first and second substrates 110 and 120, each including a flexible material or a material having elasticity, but not being limited thereto. In such an embodiment, the display panel 100 may be bent in a predetermined curvature and then be fixed and/or coupled to the cover members 400-B and 400-T in a bent state. The cover members 400-B and 400-T support the display panel 100 that may have the tendency to return to a flat state. In such an embodiment, the curvature of the display device DD may be maintained by the cover members 400-B and 400-T. In an alternative embodiment, the curvature of the display panel 100 may be defined by the curved first and second substrates 110 and 120, each including a rigid material. However, the shape of an embodiment of the display panel 100 is not limited thereto, and in an alternative embodiment, the display panel 100 may have a flat shape that is not curved.

In an embodiment, as shown in FIG. 2, the diffusion plate 200 is disposed between the display panel 100 and the backlight unit 300 on the third direction axis DR3. The diffusion plate 200 improves characteristics of light received from the backlight unit 300 to provide the light to the display panel 00. The diffusion plate 200 may substantially uniformly diffuse the incident light.

In an embodiment of the inventive concept, the diffusion plate 200 may have a predetermined curvature and a predetermined radius of curvature. The display plate 200 may have substantially the same curvature and radius curvature as the curvature and the radius of curvature R-D of the display panel 100. However, the shape of the diffusion plate 200 is not limited thereto, and in an alternative embodiment, the flat diffusion plate 200 may be disposed between the display panel 100 and the backlight unit 300. In an embodiment of the inventive concept, the diffusion plate 200 may be omitted.

In an embodiment, as shown in FIG. 2, the backlight unit 300 may include a light source 310, a light guide plate 320, a reflection member 330 and a prism plate 340.

The light discharged from the light source 310 is incident into the light guide plate 320. The light source 310 may include a plurality of light emitting diode packages 311 and a printed circuit board ("PCB") 312. The light emitting diode packages 311 are disposed, e.g., mounted, on the PCB 312. In an embodiment, as shown in FIG. 2, the light emitting diode packages 311 are arranged along one side portion of the light guide plate 320, but position and number of the light emitting diode packages 311 are not limited thereto.

The light guide plate 320 may guide the light from the light source 310 toward the display panel 100. The light guide plate 320 may include an incident surface (not shown), an opposing or facing surface (not shown), and an emission surface (not shown). The incident surface is a surface to which the light is incident from the light source 310. The emission surface is a surface from which the light is emitted toward the display panel 100. The opposing surface is a rear surface opposite to or facing the emission surface. A scattering pattern for scattering the light is defined on at least one surface of the emission surface and the opposing surface of the light guide plate 320. Thus, the light guide plate 320 may change the light irradiated from the light source 310 to the incident surface into plane light and guide the plane light to the display panel 100 through the emission surface.

The reflection member 330 is disposed adjacent to the opposing surface of the light guide plate 320. The reflection member 330 may reflect the light emitted through the opposing surface of the light guide plate 320. The light reflected by the reflection member 330 may be incident again to the light guide plate 320.

In an embodiment of the inventive concept, the reflection member 330 may have a sheet shape having a thickness of several micrometers to several hundreds micrometers. In another embodiment, the reflection member 330 may be applied onto a bottom surface of the light guide plate 320.

In an embodiment, the prism plate 340 is disposed on the light guide plate 320. The prism plate 340 may concentrate the light incident from the light guide plate 320. The light concentrated by the prism plate 340 is directed in a direction substantially parallel to the third direction axis DR3.

Figure 4:
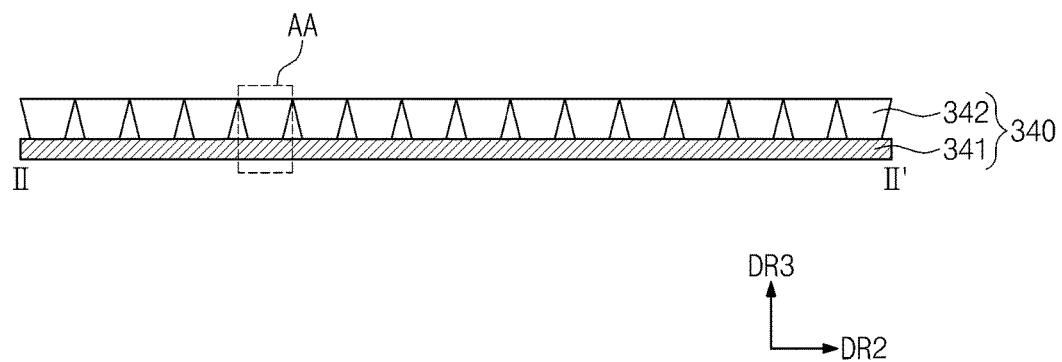
FIG. 4 is a cross-sectional view taken along line II-IF of FIG. 2.

The prism plate 340 may include a base film (see reference numeral 341 of FIG. 4) and a plurality of prisms (see reference numeral 342 of FIG. 4). The prism plate 340 will be described later in greater detail with reference to FIGS. 4 to 5B.

In an embodiment, the light guide plate 320 may have a predetermined curvature and a predetermined radius of curvature. The light guide plate 320 may have substantially the same curvature and radius of curvature R-D of the display panel 100.

The cover members 400-B and 400-T include a bottom cover 400-B and a top cover 400-T. The bottom cover 400-B and the top cover 400-T, which are coupled to each other, may maintain the curved shape of the display device DD. In an embodiment, each of the bottom cover 400-B and the top cover 400-T may be an integrated sash that is injection/ extrusion-molded or a plastic mold. In an alternative embodiment, each of the bottom cover 400-B and top cover 400-T may include a plurality of portions coupled to each other.

The cover members 400-B and 400-T may protect the display panel 100, the diffusion plate 200 and the backlight unit 300. An opening part OP-400 is defined in the top cover 400-T to expose a front surface of the display panel that defines the display surface DS.

The bottom cover 400-B includes a bottom part 400-BP and side walls 400-SW disposed along edges of the bottom part 400-BP. The bottom part 400-BP may be curved in a concave shape. A step difference may occur on an upper end of each of the side walls 400-SW. Edges of the diffusion plate 200 may be supported by the step differences of the side walls 400-SW.

Figure 3:
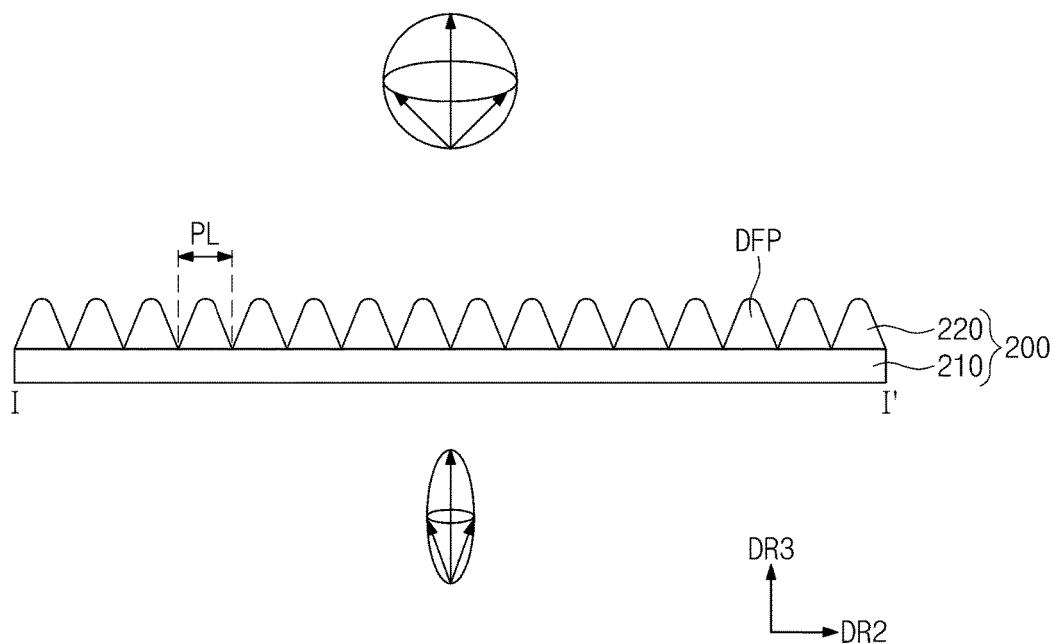
FIG. 3 is a cross-sectional view taken along line I-I' of FIG. 2.

FIG. 3 is a cross-sectional view taken along line I-I' of FIG. 2. Hereinafter, an embodiment of the diffusion plate 200 according to the inventive concept will be described with reference to FIG. 3.

An embodiment of the diffusion plate 200 includes the polarization member 210 and a lens member 220. The lens member 220 is disposed on the polarization member 210. The lens member 220 includes a plurality of diffusion patterns DFP, each of which has a convex curved section when viewed from a cross-sectional view in a thickness direction or cut in a thickness direction parallel to the third direction axis DR3.

The polarization member 210 polarizes the light concentrated and emitted from the prism plate 340 in a predetermined direction, e.g., a single direction. The light passing through the polarization member 210 is diffused by the diffusion patterns DFP of the lens member 220.

In an embodiment, a base line of each of the plurality of diffusion patterns DFP may have a length PL of about 9 micrometers (μm) to about 11 μm. In an embodiment, the base line of each of the plurality of diffusion patterns DFP may have a length PL of about 10 μm. In an embodiment, the lens member 220 may have a refractive index of about 1.43 to about 1.63. In such an embodiment, the light incident into the diffusion plate 200 may be emitted while being uniformly diffused.

In an embodiment, a display screen of an ultra high definition ("UHD") class display or the curved display including the diffusion plate 200 having the above-described structure may have improved visibility. However, when such an embodiment of the diffusion plate 200 is used, the brightness of the display device DD may be deteriorated. Thus, in an embodiment, the backlight unit capable of emitting highly concentrated light may be used to compensate such brightness deterioration.

Figure 5A:
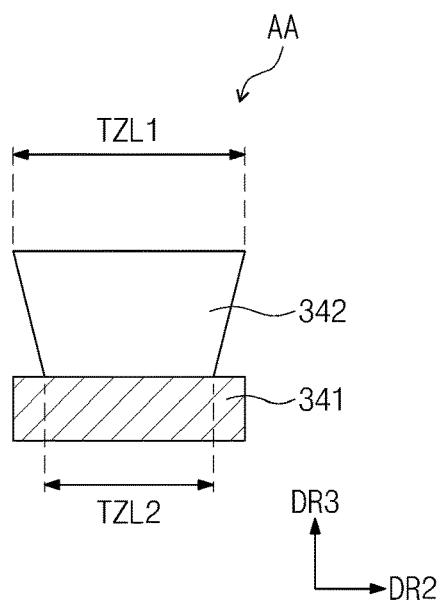
FIGS. 5A and 5B are enlarged views of the portion AA of FIG. 4.
Figure 5B:
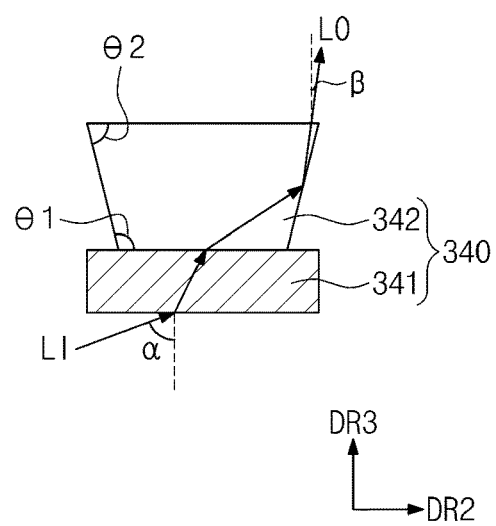

FIG. 4 is a cross-sectional view taken along line II-II' of FIG. 2. FIGS. 5A and 5B are enlarged views of the portion AA of FIG. 4.

Hereinafter, an embodiment of the prism plate 340 according to the inventive concept will be described with reference to FIGS. 4 to 5B.

Referring to FIG. 4, an embodiment of the prism plate 340 includes the base film 341 and the plurality of prisms 342.

The base film 341 may effectively prevent the prisms 342 from directly contacting the light guide plate (see reference numeral 320 of FIG. 2). Thus, damage to the light guide plate (see reference numeral 320 of FIG. 2) by the prisms 342 may be effectively prevented. In one embodiment, for example, the base film 341 may include polyethylene phthalate.

The plurality of prisms 342 is disposed on the base film 341. The prisms 342 may include a resin.

Referring to FIG. 5A, each of the prisms 342 has a trapezoidal section, two base angles of which have obtuse angles, when viewed from a cross-sectional view in the thickness direction parallel to the third direction axis DR3. That is, an upper side of the trapezoidal shape has a length TZL1 longer than that TZL2 of a lower base of the trapezoidal shape.

In an embodiment, the trapezoidal shape may be an isosceles trapezoidal shape. In such an embodiment, two base angles are substantially the same as each other. When each of the prisms 342 includes the isosceles trapezoidal section, the prism plate 340 may efficiently concentrate the light incident from a lower base thereof to emit the light to an upper side thereof.

TABLE 1

| SIZE OF BASE ANGLE | LENGTH TZL2 OF LOWER BASE/LENGTH TZL1 OF UPPER SIDE | BRIGHTNESS (nit) |
|---|---|---|
| 110° | 0.1 | 7699 |
|  | 0.3 | 16588 |
|  | 0.5 | 16621 |
|  | 0.7 | 10355 |
|  | 0.9 | 4319 |

Table 1 above shows a result in which brightness is measured according to a proportion of the length TZL2 of the lower base to the length TZL1 of the upper side when the trapezoidal shape has a base angle of about 110 degrees.

As shown in Table 1, when the lower base of the trapezoidal shape has a length TZL2 of about 0.3 times to about 0.7 times of that TZL1 of the upper side of the trapezoidal shape, a brightness value is relatively high. Thus, in an embodiment, the lower base of the trapezoidal shape may have the length TZL2 of about 0.3 times to about 0.7 times of that TZL1 of the upper side of the trapezoidal shape. In an embodiment, the upper side of the trapezoidal shape may have a length TZL1 in a range of about 45 μm to about 55 μm. In one embodiment, for example, the upper side of the trapezoidal shape may have a length TZL1 of about 50 μm. When the length TZL1 of the upper side of the trapezoidal shape is greater than the length in the above-mentioned range, the prisms 342 of the display device may be seen to users' eyes due to the size of the length, and thus the display device may be deteriorated in display quality. When the length TZL1 of the upper side of the trapezoidal shape is less than a length in the above-mentioned range, a moire pattern may be generated due to a difference of spatial frequency between prisms 342 and the pixels of the display device, thereby deteriorating the display quality.

In FIG. 5B, a light path in which incident light L1 incident into the prism plate 340 passes through the prism plate 340 and emitted as emission light LO is shown in an arrow. The variation of the light path may occur by a difference between refractive indexes of the base film 341 and the prism 342. The base film 341 may have a refractive index in a range of about 1.51 to about 1.71. Each of the prisms 342 may have a refractive index in a range of about 1.45 to about 1.65. The prism 342 may have the refractive index less than the refractive index of the base film 341. When the refractive indexes of the base film 341 and the prism 342 are in the above-described range and satisfy the above-described conditions, the light incident into the prism plate 340 may have the light path as illustrated in FIG. 5B.

When the refractive index of the base film is denoted by $n_{pct}$, the refractive index of the prism plate is denoted by $n_R$, an incident angle of light incident into the base film is denoted by α, an emission angle of light emitted from each of the plurality of prisms is denoted by β and an upper side angle of the isosceles trapezoidal shape is denoted by $\theta_2$, the relationship between the emission angle (β) and the upper side angle ($\theta_2$) is expressed as Equation 1 below.

$$\beta = \sin^{-1}\left[n_R \sin\left(\pi - \sin^{-1}\left(\frac{n_{pet}}{n_R}\sin^{-1}\left(\frac{1}{n_{pet}}\sin\alpha\right)\right) - 2\theta_2\right)\right] \quad \text{[Equation 1]}$$

The equation 1 is shortly expressed as Equation 2 below.

$$\theta_2 = \frac{1}{2}\left[\pi - \sin^{-1}\left(\frac{n_{pet}}{n_R}\sin^{-1}\left(\frac{\sin\alpha}{n_{pet}}\right)\right) - \sin^{-1}\left(\frac{\sin\beta}{n_R}\right)\right] \quad \text{[Equation 2]}$$

Here, the lower base angle of the isosceles trapezoidal shape is denoted by $\theta_1$. Since the total sum of $\theta_1$ and $\theta_2$ in the isosceles trapezoidal shape is $2\pi$ radians, $\theta_1$ and $\theta_2$ satisfy the following equation: $\theta_1=\pi-\theta_2$. $\theta_1$ is expressed as Equation 3 below, on the basis of the above Equation 2.

$$\theta_1 = \frac{\pi}{2} + \frac{1}{2}\left[\sin^{-1}\left(\frac{n_{pet}}{n_R}\sin^{-1}\left(\frac{\sin\alpha}{n_{pet}}\right)\right) + \sin^{-1}\left(\frac{\sin\beta}{n_R}\right)\right] \quad \text{[Equation 3]}$$

Referring to Equation 1, for example, when α is about $5\pi/12$, and $n_R$ is about 1.51, $n_{pct}$ is about 1.57, and $\theta_2$ is about $7\pi/18$, β may be about zero radian.

As described above, when the refractive index of the base film, the refractive index of the prism plate, the incident angle (α) of incident light L1, and value of the lower base angle ($\theta_1$) are adjusted on the basis of the Equations 1 to 3, the emission angle (β) of emission angle LO may be adjusted.

Figure 6:
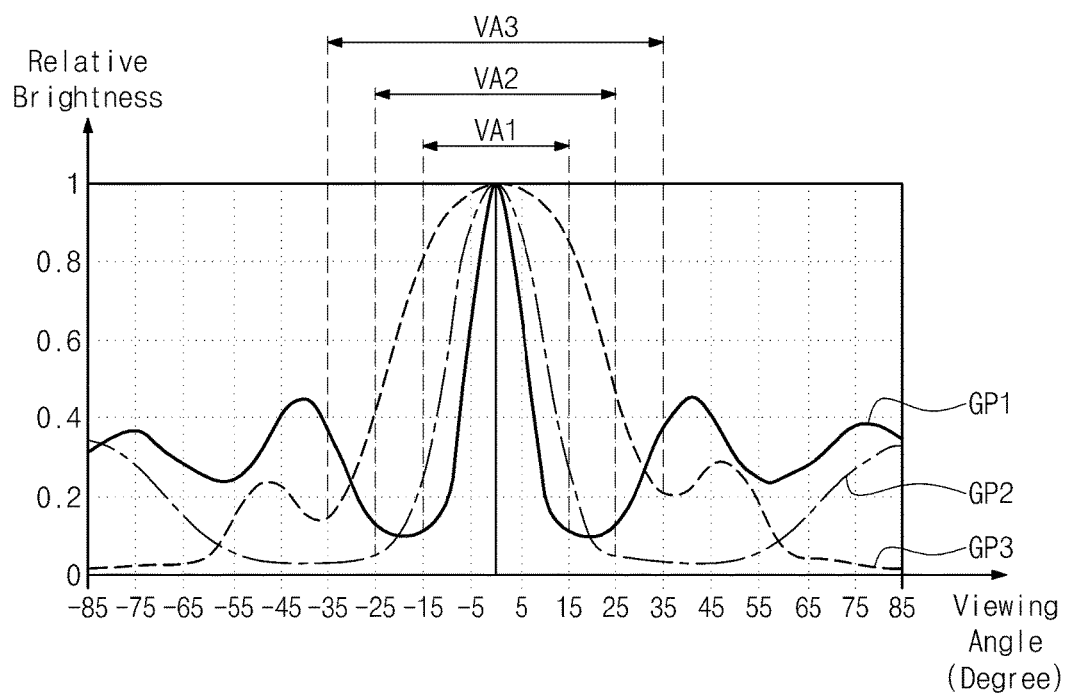
FIG. 6 is a graph comparing a light concentration degree of an embodiment of the inventive concept and a light concentration degree of a comparative embodiment.

FIG. 6 is a graph comparing a light concentration degree of an embodiment according to the inventive concept and a light concentration degree of a comparative embodiment.

In FIG. 6, a first graph GP1 is directed to an embodiment of the prism plate, a second graph GP2 is directed to a first comparative embodiment of the prism plate, and a third graph GP3 is directed to a second comparative embodiment of the prism plate. The first comparative embodiment of the prism plate has an inverted triangular shape and the second comparative embodiment of the prism plate has a triangular shape. In FIG. 6, the graphs are normalized in which the maximum valve of the brightness of the light emitted from each of the embodiments is 1 for comparison.

The first graph GP1 has a first light concentration width VA1, a second graph GP2 has a second light concentration width VA2, and a third graph GP3 has a third light concentration width VA3. Each of the first to third light concentration widths VA1, VA2 and VA3 represents light concentration degree of emission light. In a relatively narrow light concentration width, a light concentration degree of the emission light (see reference symbol LO of FIG. 5B) emitted from the prism plate (see reference numeral 340 of FIG. 5B) is relatively high.

As shown in FIG. 6, the first light concentration width VA1 is less than the second and third light concentration widths VA2 and VA3, that is, the light concentration degree of an embodiment of the inventive concept is substantially high when compared to the comparative embodiments. Accordingly, in an embodiment, the backlight unit (see reference numeral 300 of FIG. 2) may be improved in brightness through the highly concentrated light.

Figure 7:
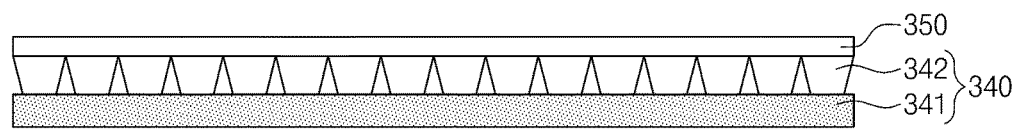
FIG. 7 is a cross-sectional view of an embodiment of a prism plate according to the inventive concept.

FIG. 7 is a cross-sectional view of an embodiment of a prism plate according to the inventive concept.

In an embodiment, a prism plate may further include an auxiliary prism plate 350 disposed on the prism plate 340. The auxiliary prism plate 350 may include or be formed of the same material as that of the prism plate 340. In an embodiment, the auxiliary prism plate 350 may have substantially the same refractive index as that of the prism plate 340. The auxiliary prism plate 350 and the prism plate 340 may be integrated with each other, that is, integrally formed as a single unitary and indivisible unit.

FIGS. 8A to 8E are cross-sectional views illustrating an embodiment of a method of manufacturing the prism plate according to the inventive concept. FIG. 9 is a flowchart showing an embodiment of the method of manufacturing the prism plate according to the inventive concept. Hereinafter, an embodiment of a method of manufacturing a prism plate 340 will be described with reference to FIGS. 8A to 9.

Figure 8A:
FIGS. 8A to 8E are cross-sectional views illustrating an embodiment of a method of manufacturing the prism plate according to the inventive concept.

Referring to FIGS. 8A and 9, an embodiment of a method of manufacturing the prism plate 340 includes providing, e.g., forming, a first adhesion member AD1 on a first base film BS1. The first adhesion member AD1 may have a first adhesion force.

Figure 8B:
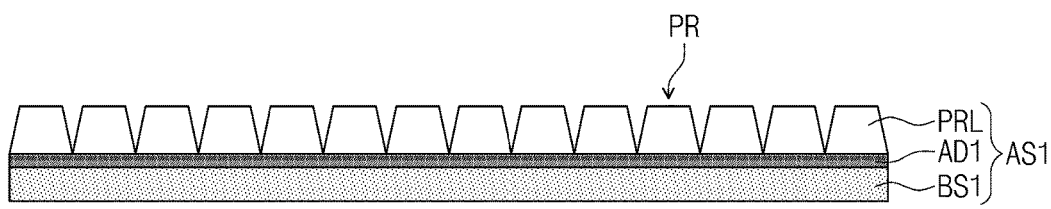

Referring to FIGS. 8B and 9, an embodiment of the method of the manufacturing the prism plate 340 further includes providing, e.g., forming, a prism layer PRL on the first adhesion member AD1 such that a first assembly member AS1 is provided. The first assembly member AS1 includes the first base film BS1, the first adhesion member AD1 and the prism layer PRL.

The prism layer PRL includes a plurality of prisms PR. Each of the prisms PR may have a trapezoidal section, two lower base angles of which are acute angles when viewed from a cross-sectional view in a thickness direction. The trapezoidal shape may be an isosceles trapezoidal shape.

The first adhesion member AD1 adhere the first base film BS1 and the prism layer PRL to each other, which have different characteristics from each other. The first base film BS1 may be attached to the prism layer PRL through primer treatment. An adhesion force between the first base film BS1 and the prism layer PRL may be reduced through the primer treatment. In such an embodiment, the adhesion force between the first base film BS1 and the prism layer PRL is lowered, to allow effective separation between the first base film BS1 and the prism layer PRL in a following process.

Figure 8C:
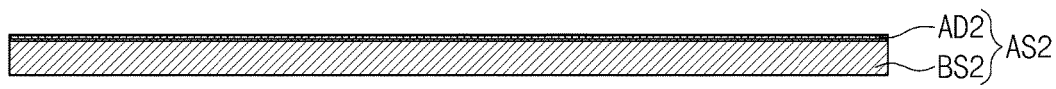

Referring to FIGS. 8C and 9, an embodiment of the method of manufacturing the prism plate 340 further includes providing, e.g., forming, a second adhesion member AD2 on a second base film BS2, such that a second assembly member AS2 is provided. The second assembly member AS2 includes the second base film BS2 and the second adhesion member AD2. The second adhesion member AD2 may have a second adhesion force. The second adhesion force may be greater that the first adhesion force.

Figure 8D:
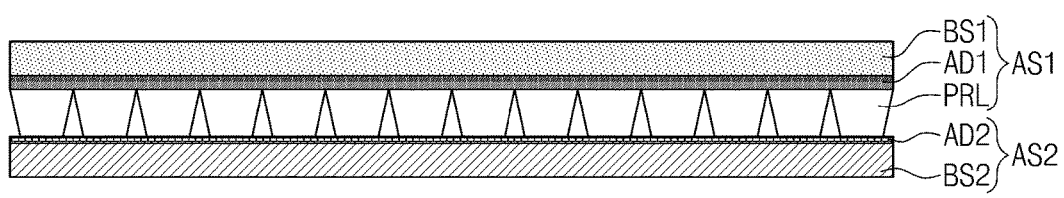

Referring to FIGS. 8D and 9, an embodiment of the method of manufacturing the prism plate 340 further includes adhering the prism layer RPL to the second adhesion member AD2, such that the first assembly member AS1 is adhered to the second assembly member AS2.

Figure 8E:
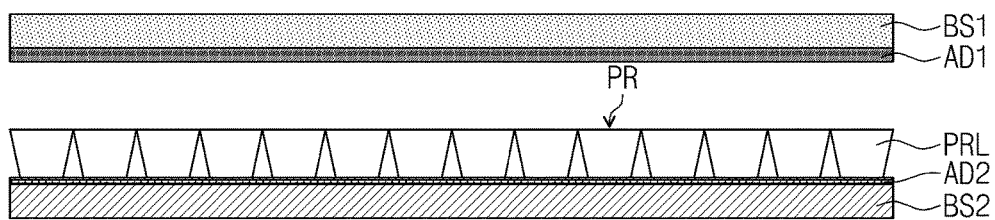

Referring to FIGS. 8E and 9, an embodiment of the method of manufacturing the prism plate 340 further includes separating the first adhesion member AD1 from the prism layer PRL.

In such an embodiment, the second adhesion force is greater than that of the first adhesion force, such that a phenomenon in which the prism layer PRL is separated from the second adhesion member AD2 or the second base film BS2 in the process for separating the first adhesion member AD1 from the prism layer PRL may be effectively prevented.

When the first adhesion member AD1 is separated from the prism layer PRL, a coupled body including the second base film BS2, the second adhesion member AD2 and the prism layer RPL is formed. The coupled body may have substantially the same shape as the prism plate 340 of FIG. 4. In such an embodiment, the characteristics of the prisms PR included in the prism layer PRL are substantially the same as those described above with reference to FIGS. 5A, 5B and 6, and any repetitive detailed description thereof will be omitted.

According to embodiments of the inventive concept, a prism plate that improves concentration efficiency of incident light and a display device having the prism plate may be provided.

Also, according to embodiments of the inventive concept, the phenomenon in which the light guide plate is damaged by the plurality of prisms of the prism plate may be effectively prevented.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A display device comprising:
a display panel; and
a backlight unit which provides light to the display panel, wherein the backlight unit comprises:
a light source which emits the light;
a light guide plate which guides the light emitted from the light source toward the display panel; and
a prism plate comprising:
  a base film disposed on the light guide plate; and
  a plurality of prisms disposed on the base film with the base film disposed between the light guide plate and the plurality of prisms,
wherein each of the plurality of prisms has a trapezoidal section, two base angles of which are obtuse angles, when viewed from a cross-sectional view in a thickness direction, and light incident on a base of each prism defining the base angles transmits the incident light therethrough.

2. The display device of claim 1, wherein the trapezoidal shape is an isosceles trapezoidal shape.

3. The display device of claim 2, wherein a value ($\theta$) of each of the two base angles satisfies the following equation:

$$\theta = \frac{\pi}{2} + \frac{1}{2}\left[\sin^{-1}\left(\frac{n_{pet}}{n_R}\sin^{-1}\left(\frac{\sin\alpha}{n_{pet}}\right)\right) + \sin^{-1}\left(\frac{\sin\beta}{n_R}\right)\right]$$

wherein
$n_{pet}$ denotes a refractive index of the base film,
$n_R$ denotes a refractive index of the prism plate,
$\alpha$ denotes an incident angle of light incident into the base film, and
$\beta$ denotes an emission angle of light emitted from each of the plurality of prisms.

4. The display device of claim 3, wherein
the incident angle $\alpha$ of light incident into the base film is about $7\pi/18$ radian, and
the emission angle $\beta$ of light emitted from each of the plurality of prisms is about zero radian.

5. The display device of claim 2, wherein
each of the plurality of prisms has a refractive index in a range of about 1.45 to about 1.65, and
the base film has a refractive index in a range of about 1.51 to about 1.71.

6. The display device of claim 5, wherein the refractive index of each of the plurality of prisms is less than the refractive index of the base film.

7. The display device of claim 6, wherein a lower base of the trapezoidal shape has a length of about 0.3 times to about 0.7 times of a length of an upper side of the trapezoidal shape.

8. The display device of claim 7, wherein the upper side has a length in a range of about 45 micrometers to about 55 micrometers.

9. The display device of claim 8, wherein the prism plate further comprises an auxiliary prism plate disposed on the plurality of prisms.

10. The display device of claim 9, wherein the auxiliary prism plate and the plurality of prisms are integrated with each other.

11. The display device of claim 8, further comprising:
a diffusion plate disposed between the prism plate and the display panel,
wherein the diffusion plate comprises:
a polarization member; and
a lens member disposed on the polarization member and comprising a plurality of diffusion patterns,
wherein each of the plurality of diffusion patterns comprises a convex lens surface.

12. The display device of claim 11, wherein a lower base of each of the plurality of diffusion patterns has a length in a range of about 9 micrometers to about 11 micrometers.

13. The display device of claim 12, wherein the lens member has a refractive index in a range of about 1.43 to about 1.63.

14. The display device of claim 8, wherein a curved display surface is defined in the display panel along a direction axis.

15. The display device of claim 14, wherein the light guide plate is curved along the direction axis.

* * * * *